US011036256B2

(12) United States Patent
Lalinde

(10) Patent No.: US 11,036,256 B2
(45) Date of Patent: Jun. 15, 2021

(54) HANDLES

(71) Applicant: HEWLETT-PACKARD DEVELOPMENT COMPANY, L.P., Houston, TX (US)

(72) Inventor: Paul R Lalinde, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/323,008

(22) PCT Filed: Sep. 30, 2016

(86) PCT No.: PCT/US2016/054741
§ 371 (c)(1),
(2) Date: Feb. 4, 2019

(87) PCT Pub. No.: WO2018/063317
PCT Pub. Date: Apr. 5, 2018

(65) Prior Publication Data
US 2019/0212775 A1 Jul. 11, 2019

(51) Int. Cl.
| | |
|---|---|
| *G06F 1/16* | (2006.01) |
| *A45F 5/10* | (2006.01) |
| *A45F 5/00* | (2006.01) |
| *A45C 13/22* | (2006.01) |
| *A45C 13/28* | (2006.01) |

(52) U.S. Cl.
CPC ............ *G06F 1/1628* (2013.01); *A45C 13/22* (2013.01); *A45C 13/28* (2013.01); *A45F 5/00* (2013.01); *A45F 5/10* (2013.01); *G06F 1/1626* (2013.01); *A45C 2013/223* (2013.01); *A45F 2005/1086* (2013.01); *A45F 2200/0525* (2013.01)

(58) Field of Classification Search
None
See application file for complete search history.

(56) References Cited

U.S. PATENT DOCUMENTS

| | | | |
|---|---|---|---|
| 6,708,887 B1 * | 3/2004 | Garrett ................. | G06F 1/1626 235/462.45 |
| 7,651,029 B1 * | 1/2010 | Mangaroo ......... | G06K 7/10881 235/462.45 |
| 7,877,841 B2 * | 2/2011 | Mangaroo ......... | G06K 7/10881 16/422 |
| 7,898,801 B2 * | 3/2011 | Wang ................... | F16M 13/005 361/679.59 |
| 7,916,478 B2 * | 3/2011 | Tu ........................ | F16M 13/005 361/679.59 |

(Continued)

OTHER PUBLICATIONS

Linder, B, "CTL 2Go PC Convertible Tablet Review", Jan. 2, 2009.
Smith, C. "Intel-Powered Convertible Classmate PC (Quanta NL) Review", May 14, 2010.

*Primary Examiner* — Anthony Q Edwards
*Assistant Examiner* — Rashen E Morrison
(74) *Attorney, Agent, or Firm* — HPI Patent Department

(57) ABSTRACT

In an example, a handle may include a grip to attach to a device, an attachment post disposed on a first end of the grip, a slot interface disposed on a second end of the grip, and a supplemental interface disposed in between the attachment post and the slot interface. The attachment post, the slot interface, and the supplemental interface may extend radially out from the grip and may attach the grip to the device.

11 Claims, 5 Drawing Sheets

(56) References Cited

U.S. PATENT DOCUMENTS

| | | | |
|---|---|---|---|
| 8,152,071 B2 | 4/2012 | Doherty et al. | |
| 8,177,175 B2 * | 5/2012 | Chang | F16M 11/10 |
| | | | 248/168 |
| 8,289,692 B2 * | 10/2012 | Franz | G06F 1/183 |
| | | | 361/679.33 |
| 8,508,937 B2 * | 8/2013 | Chen | G06F 1/1628 |
| | | | 361/679.59 |
| 8,767,396 B2 | 7/2014 | Shindo et al. | |
| 9,052,873 B2 * | 6/2015 | Murakata | G06F 1/1626 |
| 9,179,567 B2 * | 11/2015 | Hung | G06F 1/166 |
| 9,388,939 B2 * | 7/2016 | Girault | G06F 1/1632 |
| 9,408,317 B1 * | 8/2016 | Luo | F16M 11/046 |
| 9,930,795 B2 * | 3/2018 | Chang | A45F 5/10 |
| 9,995,432 B1 * | 6/2018 | Girault | G06F 1/1686 |
| 10,139,865 B2 * | 11/2018 | Koriyama | G06F 1/1626 |
| 2002/0085342 A1 * | 7/2002 | Chen | G06F 1/1616 |
| | | | 361/679.55 |
| 2007/0132259 A1 | 6/2007 | Ivannikov et al. | |
| 2008/0186665 A1 * | 8/2008 | Kuo | E05C 3/048 |
| | | | 361/679.57 |
| 2010/0018006 A1 | 1/2010 | Boyd et al. | |
| 2010/0177467 A1 * | 7/2010 | Wang | G06F 1/1628 |
| | | | 361/679.01 |
| 2012/0044624 A1 * | 2/2012 | Hoffman | G06F 1/1628 |
| | | | 361/679.21 |
| 2013/0311817 A1 * | 11/2013 | Kim | G06F 1/10 |
| | | | 713/501 |
| 2014/0126230 A1 | 5/2014 | Harris | |
| 2016/0088747 A1 * | 3/2016 | Kuo | G06F 1/1616 |
| | | | 361/807 |
| 2016/0215926 A1 * | 7/2016 | Pollex | G06F 1/1626 |
| 2019/0212775 A1 * | 7/2019 | Lalinde | A45F 5/00 |

* cited by examiner

HANDLES

BACKGROUND

Devices including computing devices may be portable and/or capable of being hand-held by a user. A user may move the device with a hand, or carry the device around with a hand. Further, a user may hold the device with both hands, or may prefer to hold the device with one hand in order to manipulate, handle, or use the device.

DETAILED DESCRIPTION

Devices, including computing devices, may be portable and/or capable of being hand-held by a user. A user may move the device with a hand, or carry the device around with a hand. Further, a user may hold the device with both hands, or may prefer to hold the device with one hand in order to manipulate, handle, or use the device. In some situations, the device may have a structure that may be challenging to hold, such as a flat and/or thin structure. In some situations, holding on to such a device for an extended period of time may fatigue and/or cause pain or discomfort in the user's hand or hands. Additionally, a device may have a thin structure with smooth sides or panels. Such panels may provide insufficient gripping or handling friction to the user, and may prove difficult to grasp for an extended period of time.

In some situations, it may be desirable to provide a device with a handle or another feature for a user to grasp in order to carry, manipulate, or use the device. Such handles may be disposed on a supplementary jacket or cover for the device. Thus, in order for a user to use the handle to carry or use the device easily, the supplemental jacket or cover to which the handle is affixed may previously be installed or attached to the device. Such a jacket or handle may be undesirable in some situations, as they may be cumbersome or awkward to open or remove in order to use the device, and, additionally, such jackets or covers may add additional weight, size, and/or thickness to the device.

In some situations, it may be desirable to use an accessory in conjunction with a device. Such accessories may include extra batteries, storage drives, or other suitable accessories. Accessories may be used with the device by using a cord or plug to engage the accessory with the device. Accordingly, such a situation may render the device less-portable than when used without the accessories, as a user may carry the device, as well as any accessory that may be plugged into the device.

Implementations of the present disclosure provide handles for devices that may be removably attached to the respective device for a user to grab or hold while carrying, manipulating, or using the device. Further, implementations of the present disclosure may provide handles that may be attached to a device without the use of a supplemental jacket or cover, which may make the device easier to use while the handle is attached. Additionally, implementations of the present disclosure may provide handles that may enable the use of an accessory or accessories with the device, while maintaining the portable nature of the device.

Figure 1:
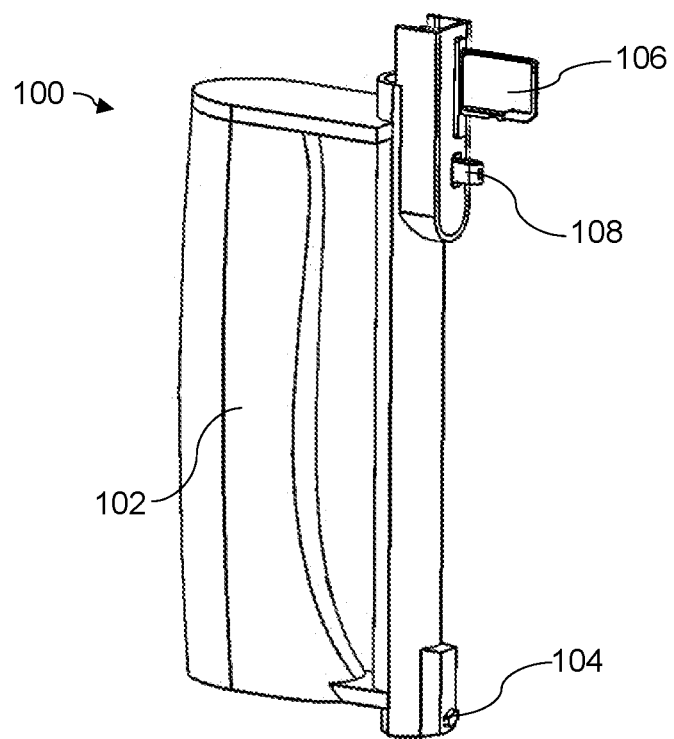
FIG. 1 is a perspective view of an example handle.

Referring now to FIG. 1, a perspective view of an example handle 100 is illustrated. Example handle 100 may include a grip 102 to attach to a device. In order to attach or engage the grip 102 with a device, the handle 100 may also include an attachment post 104 disposed at a first end of the grip 102, and a slot interface 106 disposed at a second end of the grip 102. In some implementations, the first end and the second end may be opposite ends of the grip 102, such as a bottom end and a top end, for example, or in further implementations, may be spaced apart from one another along a length of the grip 102. In additional implementations, the handle 100 may include a supplemental interface 108. In further implementations, the supplemental interface 108 may be disposed along the grip 102 and in between the attachment post 104 and the slot interface 106. In other implementations, the supplemental interface 108 may be disposed along the grip 102, but outside of either the attachment post 104 or the slot interface 106. In some implementations, the attachment post 104, the slot interface 106, and/or the supplemental interface 108 may extend radially out from the grip, and may attach the grip, and thus the handle 100, to the device. In further implementations, the attachment post 104, the slot interface 106, and/or the supplemental interface 108 may rigidly attach the grip 102, and thus the handle 100, to the device.

Figure 2A:
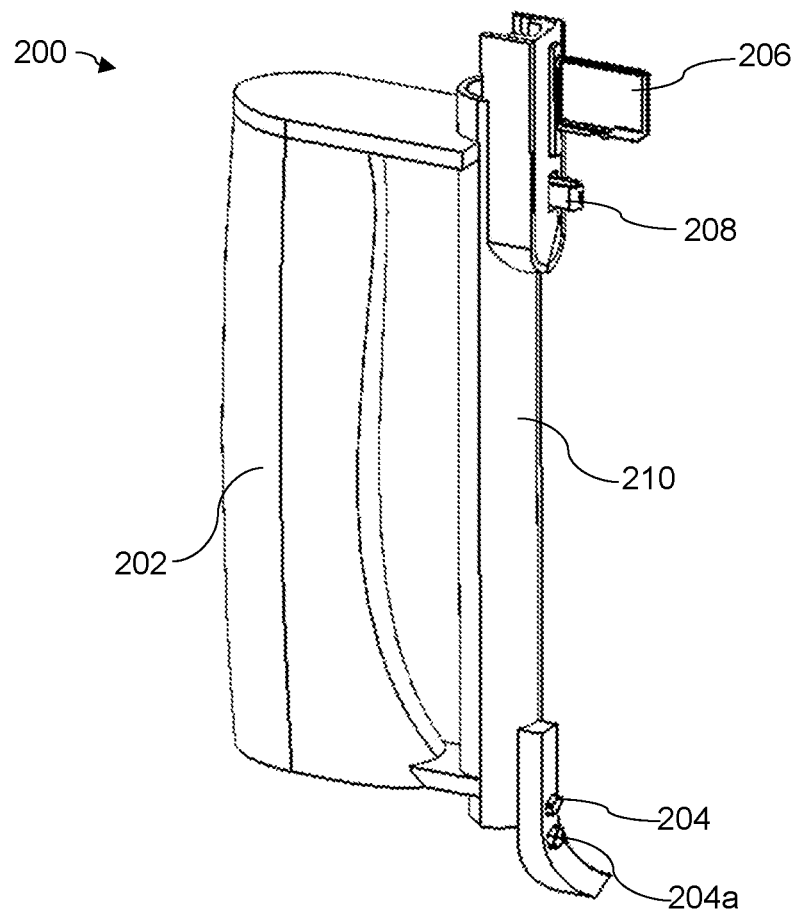
FIG. 2A is a perspective view of an example handle.

Referring now to FIG. 2A, a perspective view of an example handle 200 is illustrated. Example handle 200 may be similar to example handle 100. Further, the similarly named elements of example handle 200 may be similar in function and/or structure to the elements of example handle 100, as they are described above. The handle 200 may include a grip 202. The grip 202 may be an elongate member having a longitudinal axis. In some implementations, the grip 202 may be a tube, a barrel, or may have another structure that is suitable for a user of a device to hold. In further implementations, the grip 202 may include a contoured geometry to fit within the hand of a user. In further implementations, the handle 200 may also include an attachment barrel 210. The attachment barrel 210 may be an elongate member, and may extend along the grip 202, or, in some implementations, along the longitudinal axis of the grip 202, and/or parallel to the grip 202. In other words, the attachment barrel 210 may extend axially along the grip 202, in some implementations. The attachment barrel 210 may be spaced apart from the grip 202 such that a user may hold the grip 202 without the attachment barrel 210 interfering with the user's hand.

The handle 200 may also include an attachment post 204, a slot interface 206, and a supplemental interface 208. The attachment post 204 may be a protrusion, a tab, a post, or another protruding member. In some implementations, the attachment post 204 may be disposed on the grip 202, or a first end thereof, and extend from the grip 202, or in further implementations, may be disposed on the attachment barrel 210, or a first end thereof, and may extend from the attachment barrel 210. The attachment post 204 may engage with a complementary aperture, orifice, or receptacle of the device. In some implementations, the handle 200 may also include a secondary attachment post 204a. The secondary attachment post 204a may be disposed adjacent to the attachment post 204. The attachment post 204 and the secondary attachment post 204a may together engage with a receptacle of the device suitable to receive a two-prong protrusion. Such a receptacle may be a lanyard loop, for example, or may be two separate receptacles disposed adjacent to each other. In some implementations, the attachment post 204 may engage with a lanyard loop of the device by itself, without the aid of the secondary attachment post 204a. In some implementations, the attachment post 204 may have a hook-like structure, or an L-shaped structure such that the attachment post may hook into a receptacle of the device. In further implementations, the attachment post 204 may have a structure that may snap or clip into the complementary receptacle of the device.

The slot interface 206 may be a protruding tab, plate, frame, or may have another structure suitable to engage with or be received by a female slot receptacle or interface of the device. In some implementations, the slot interface 206 may be disposed on the grip 202, or a second end thereof, and extend from the grip 202, or in further implementations, may be disposed on the attachment barrel 210, or a second end thereof, and may extend from the attachment barrel 210. The slot interface 206 may engage with a complementary or receiving slot, orifice, or aperture of the device. The slot interface 206, in some implementations, may be a data slot interface to engage with or be received within a data slot of the device. In some implementations, the data slot may be a memory card slot, and the data slot interface may hold or support a complementary memory card and operably engage the memory card with the memory card slot. In further implementations, the data card slot may be a Secure Digital memory card (SD Card) slot and the data slot interface may hold or support an SD Card and operably engage the SD Card with the SD Card slot. In yet further implementations, the data slot may be another type of memory card slot, and the data slot interface may have a complementary structure to operably engage an appropriate or matching memory card with the memory card slot. In this context, the term operably engage may refer to the ability of the memory card to engage with the memory card slot such that the transmission of data signals may occur between the memory card and the device. In some implementations, the data slot may be a Universal Serial Bus (USB) slot or port, and the data slot interface may be a complementary USB plug that may operably engage with the USB slot such that the transmission of data signals may occur between the USB plug and the device.

In some implementations, the handle 200 may further include a supplemental interface 208 to engage with a complementary receptacle or aperture of the device. The supplemental interface 208 may be a protrusion, a tab, a post, or another protruding member. In further implementations, the supplemental interface 208 may be a locking device, such as a Kensington Lock (K-Lock), and may engage with a complementary locking device interface or aperture, such as a K-Lock interface, on the device. In some implementations, the supplemental interface 208 may be disposed on the grip 202 and extend from the grip 202, or in further implementations, may be disposed on the attachment barrel 210, and may extend from the attachment barrel 210. The supplemental interface 208 may be disposed on the grip 202 or the engagement barrel 210 in between the attachment post 204 and the slot interface 206, in some implementations.

In some implementations, the attachment post 204, the slot interface 206, and the supplemental interface 208 may extend from the engagement barrel 210 and may each engage with a receptacle on the device to engage the attachment barrel 210 with the device. The attachment barrel 210 may engage with the device such that the grip 202 is rigidly attached to the device, and a user may hold or carry the device by handling the grip 202 of the handle 200. In other words, the engagement barrel 210 may rigidly attach the handle 200, and the grip 202 thereof, to the device, and/or a side of the device. Further, each of the attachment post 204, the slot interface 206, and the supplemental interface 208 may extend from the engagement barrel 210 such that they each extend radially from, or along a radius of, the grip 202. In yet further implementations, the attachment post 204, the slot interface 206, and the supplemental interface 208 may extend along the same direction as one another, extend parallel to one another, and/or extend in the same plane as one another such that they each engage with a complementary aperture or orifice of the device that are all disposed on the same side of the device.

Figure 2B:
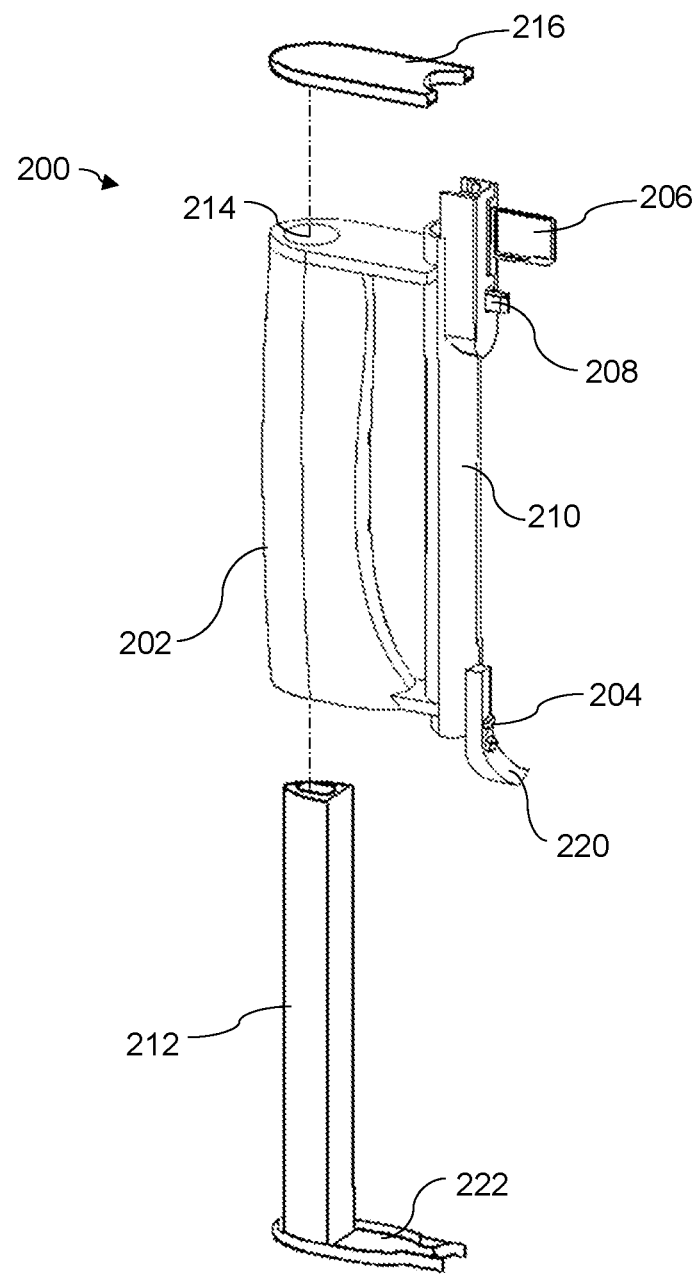
FIG. 2B is a perspective exploded view of an example handle.

Referring additionally to FIG. 2B, an exploded perspective view of the example handle 200 is illustrated. In some implementations, the grip 202 may be hollow, may be a shell, or may have a core or compartment 214 within the grip 202. The compartment 214 may receive an accessory 212 in some implementations, which may be a computing accessory in further implementations. The accessory 212 may operably engage with the device through the engagement of the slot interface 206 with the complementary or receiving slot of the device in implementations wherein the slot is a data slot and the slot interface is a complementary data slot interface. In other implementations, the accessory 212 may operably engage with the device through an external cord and/or connector, such as a USB connector, or, further, a USB type C connector. In some implementations, the accessory 212 may be a computing accessory, such as a battery, a storage drive, a speaker or speaker box, a projector or pico projector, a scanner, an external solid-state drive (SSD) card, or another computing component, device, or accessory suitable to fit within the grip 202. In further implementations, the accessory 212 may be multiple accessories, such as a battery and a storage drive disposed together within the grip. The battery and/or storage drive may operably engage with the device such that they may transfer data, power, or otherwise communicate with the device through the engagement of the data slot interface with the data slot of the device.

In some implementations, the handle 200 may additionally include a base plate 222. The base plate 222 may partially or wholly conceal a bottom opening of the compartment 214 when the base plate 222 is assembled on to the handle 200. In further implementations, the base plate 222 may be attached to or assembled on to the accessory 212, and may conceal the bottom opening when the accessory is fully inserted into or disposed within the compartment 214. In some implementations, the handle 200 may further include a top plate 216 to partially or wholly conceal a top opening of the compartment 214 when the top plate 216 is assembled on to the handle 200. In yet further implementations, the handle 200 may include a printed circuit board (PCB) and/or other circuitry to engage the accessory 212 with the slot interface 206. In some implementations, the PCB or other circuitry may be disposed on or within the top plate 216, or may be concealed by the top plate 216 when the top plate 216 is assembled on to the handle 200. In other implementations, the PCB or other circuitry may be disposed elsewhere in or on the handle 200 to engage the accessory 212 with the slot interface 206.

In some implementations, the handle 200, or the grip 200 or attachment barrel 210 thereof, may include a support portion 220 to engage with the device. The support portion may be a molding, trim, or other suitable component to engage with an exterior surface, shell, corner, or other part of the device. In some implementations, the support portion 220 may help the handle 200 structurally support the weight or mass of the device when the device is being held through the handle 200 by a user. In other implementations, the support portion 220 may improve the aesthetics or appearance of the handle 200 and/or device when the handle 200 is attached to the device.

Figure 3A:
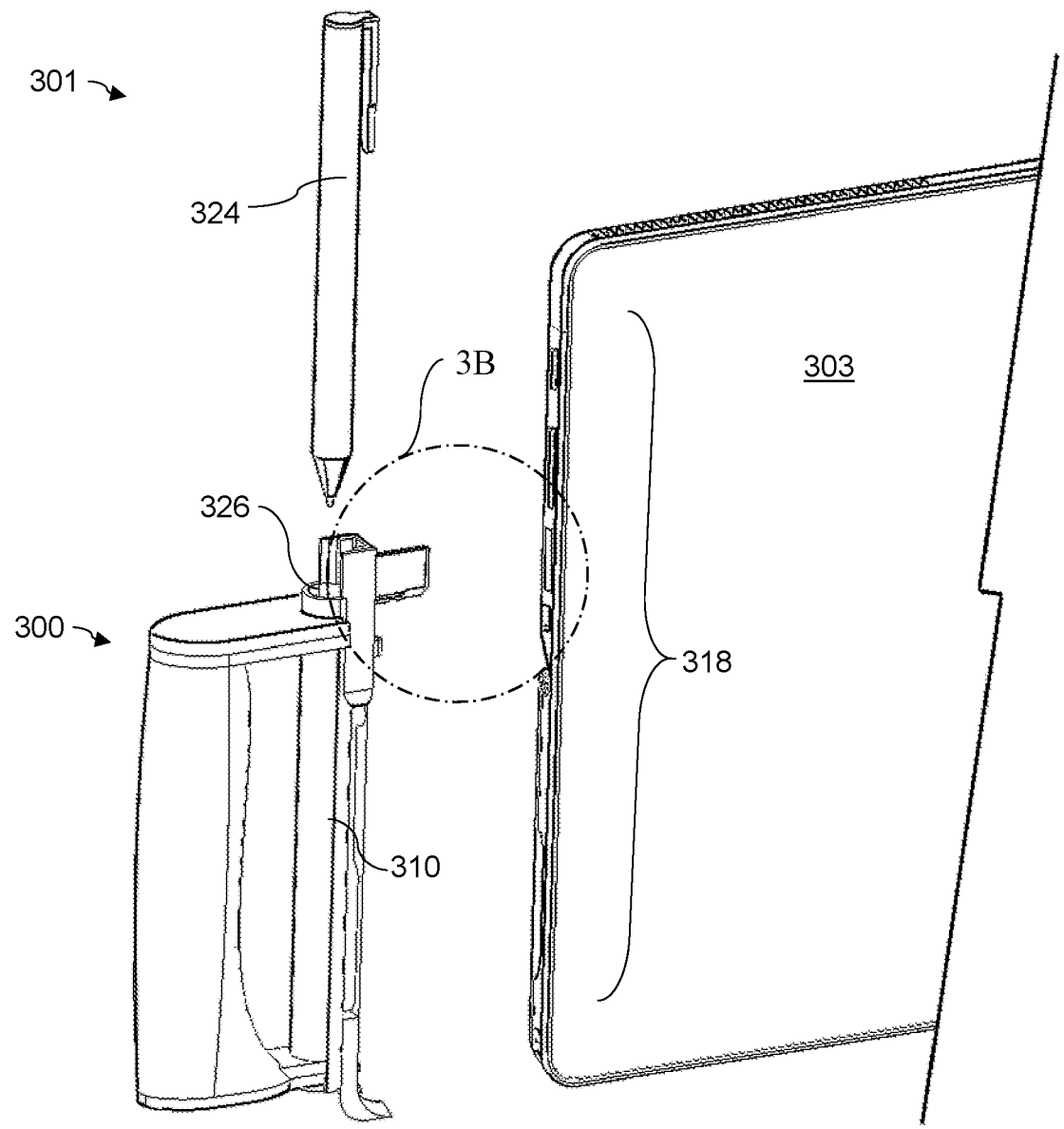
FIG. 3A is a perspective exploded view of an example computing device assembly including an example handle.

Referring now to FIG. 3A, a perspective view of a computing device assembly 301 is illustrated. In some implementations, the computing device assembly 301 may include a device 303 and an example handle 300 to removably attach to the device 303. Example handle 300 may be similar to example handle 100 or 200. Further, the similarly named elements of example handle 300 may be similar in function and/or structure to the elements of example handle 100 or 200, as they are described above. Device 303 may be a computing device, in some implementations. The device 303 may include components such as processors, storage drives, motherboards, memory, displays, power supplies, or other components suitable for use in a computing device. In some implementations, the device 303 may be a tablet computer. In further implementations, the device 303 may be another type of computing device. In some implementations, the device 303 may include ports, plugs, slots, or other orifices or apertures such as USB ports, data slots, power cord receptacles, K-Lock receptacles, lanyard loops, or other receptacles. In some implementations, some or all of such receptacles may be disposed along a side of the device 303, for example along side 318 of device 303.

In some implementations, the computing device assembly 301, or the device 303 thereof, may include a stylus 324. The stylus 324 may be an accessory to be used in conjunction with the device 303. In some implementations, the stylus 324 may be an electronic writing utensil or pointer. In further implementations, the stylus 324 may be used to electronically write on a display of the device 303, or otherwise be used to make electronic selections or indications on the display. In other implementations, the stylus may be a standard writing utensil, such as a pen or pencil. The handle 300, in some implementations, may include an attachment barrel 310. The attachment barrel 310 may be hollow or have a bore or sleeve 326. The engagement barrel 310 may receive the stylus 324 within the engagement barrel 310. In some implementations, the stylus 324 may be insertable into the engagement barrel 310, and may be stowed within. In further implementations, the stylus 324 may be charged or recharged while disposed within the engagement barrel 310.

Figure 3B:
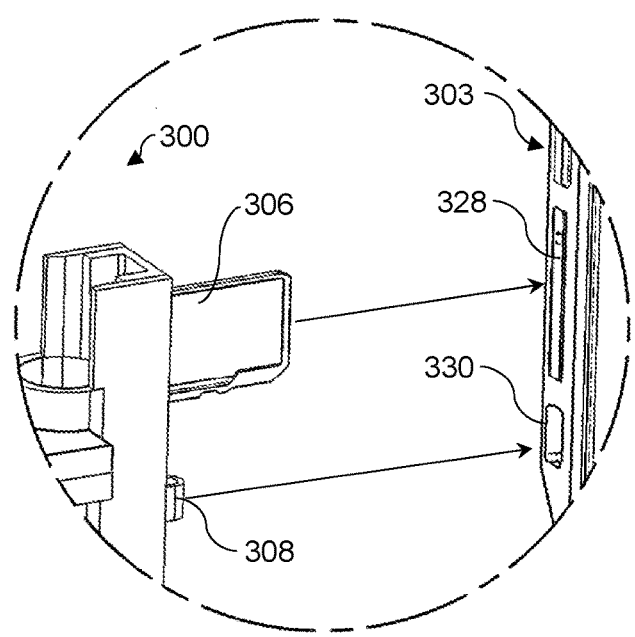
FIG. 3B is a detail view of an example computing device assembly including an example handle.
Figure 3C:
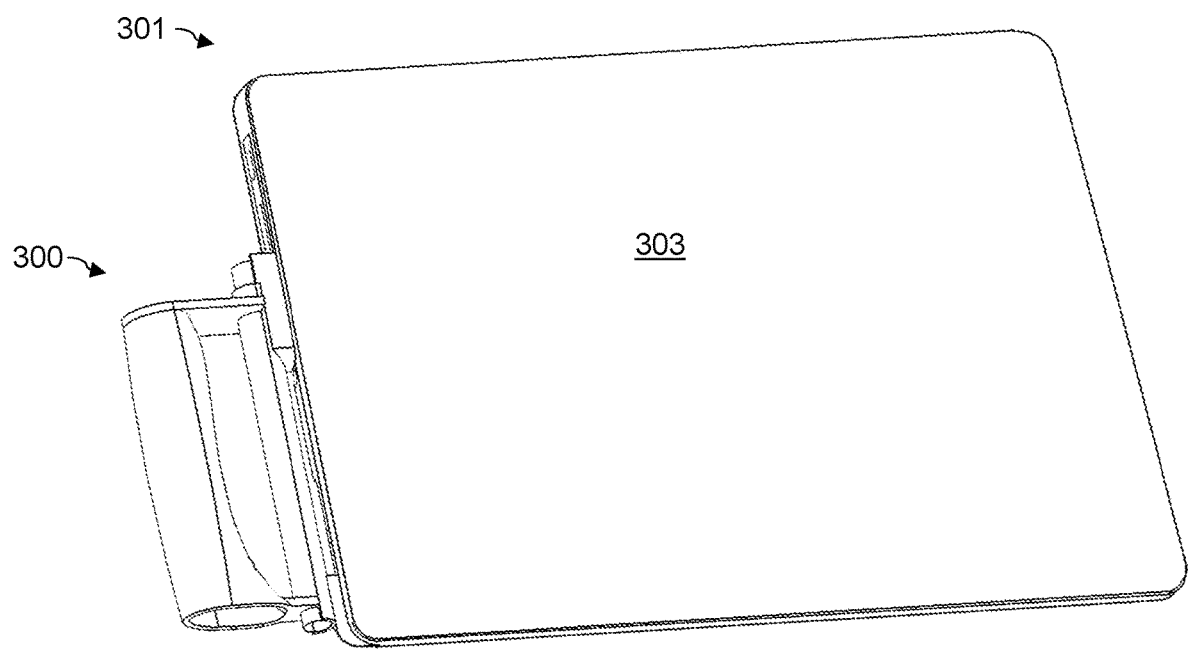
FIG. 3C is a perspective view of an example computing device assembly including an example handle.

Referring now to FIG. 3B, a detail view of an example computing device assembly is illustrated. In some implementations, the handle 300 may engage with and attach to the device 303. The handle 300 may include an attachment post, a slot interface 306, and a supplemental interface 308. The slot interface 306 may engage with a complementary slot 328 of the device 303, as illustrated. In some implementations, the slot 328 may be a data slot, such as a USB port, or an SD Card slot. Additionally, the supplemental interface 308 may engage with a complementary aperture or receptacle 330 of the device 303, as illustrated. In some implementations, the supplemental interface 308 may be a K-Lock and it may operably engage with a complementary K-Lock interface 330 of the device 303. In some implementations, the stylus 324 may actuate the K-Lock if stylus 324 is inserted into the attachment barrel 310, or the sleeve 326 therein. When actuated, the K-Lock may be locked within the receptacle 330 such that the K-Lock is retained within the receptacle 330 and cannot be removed from it. As such, when the K-Lock is locked within the receptacle 330, the handle 300 may be unable to be detached from the device 300. In other implementations, the K-Lock may be actuated through a different mechanism. Referring now to FIG. 3C, a perspective view of an example computing device assembly 301 is illustrated, wherein the handle 300 is operably engaged with and attached to the device 303. A user may hold the handle 300, or a grip thereof, in order to carry, manipulate, or use the device 303.

What is claimed is:

1. A handle, comprising:
   a grip;
   a computing accessory removably disposed within the grip:
   an attachment barrel extending along a longitudinal, axis of the grip and spaced away front the grip, the attachment barrel to rigidly attach the grip to a side of a computing device;
   an attachment post disposed on a first end of the attachment barrel;
   a slot interface disposed on a second end of the attachment barrel and in electrical communication with the computing accessory when disposed in the grip: and
   a supplemental interthee disposed in between die attachment post and the slot interface,
   wherein the attachment post, the slot interface, and the supplemental interface extend radially out from the attachment barrel and are to attach the attachment barrel to the computing device.

2. The handle of claim 1, wherein the attachment post, the slot interface, and the supplemental interface are to each engage with a receptacle of the computing device to engage the attachment barrel with the computing device.

3. The handle of claim 1, wherein the slot interface is a data slot interface, to engage with a data slot of the computing device the data slot interface to enable the transmission of electrical signals between the computing accessory and the computing device.

4. The handle of claim 3, wherein the attachment post is to engage with a lanyard loop of the computing device.

5. A handle, comprising
   a grip including a compartment to receive a computing accessory;
   an attachment post disposed on a first end of the grip to engage with an aperture of a computing device;
   a data slot interface disposed on a second end of the grip to engage with a data slot of the computing device; and
   a supplemental interface disposed in between the attachment post and the data slot interface,
   wherein the attachment post, the data slot interface, and the supplemental interface extend radially Out from the grip and are to rigidly attach the grip to the computing device, and wherein the computing accessory is to operably engage with the computing device through the engagement of the data slot interface with the data slot so as to enable the transmission of electrical signals between the computing accessory and the computing device.

6. The handle of claim 5, wherein the data slot is a Secure Digital memory card (SD Card) slot and the data slot interface is to support an SD Card and operably engage the SD Card with the SD Card slot.

7. The handle of claim 5, wherein the data slot is a Universal Serial Bus (USB) slot and the data slot interface is a complementary USB plug.

8. The handle of claim 5, wherein the computing device is a tablet computer.

9. The handle of claim 5, wherein the computing accessory is a storage drive.

10. The handle of claim 5, wherein the computing accessory is a battery.

11. A computing device assembly, comprising:
- a computing device; and
- a handle comprising:
  - a grip;
  - an attachment barrel extending along a longitudinal axis of the grip, the attachment barrel to rigidly attach the handle to the computing device and to receive a stylus of the computing device within the attachment barrel;
  - an attachment post disposed on a first end of the attachment barrel;
  - a slot interface disposed on a second end of the attachment barrel; and
  - a Kensington Lock (K-Lock) interface disposed on the attachment barrel in between the attachment post and the slot interface,
  - wherein the stylus is to actuate the K-Lock interlace if inserted into the attachment barrel, and
  - wherein the attachment post, the slot interface, and the K-Lock interface extend from the attachment barreland are to each engage with a receptacle of the computing device to engage the attachment barrel with the computing device.

* * * * *